United States Patent [19]

Klaiber

[11] Patent Number: 4,790,770
[45] Date of Patent: Dec. 13, 1988

[54] CONNECTOR BANK FOR CABLE WIRES, IN PARTICULAR OF TELEPHONE CABLES

[75] Inventor: Eberhard Klaiber, Berlin, Fed. Rep. of Germany

[73] Assignee: Krone Aktiengesellschaft, Fed. Rep. of Germany

[21] Appl. No.: 37,703

[22] Filed: Apr. 13, 1987

[30] Foreign Application Priority Data

Apr. 30, 1986 [DE] Fed. Rep. of Germany ....... 3614592

[51] Int. Cl.$^4$ .............................................. H01R 4/24
[52] U.S. Cl. .................................... 439/395; 439/715; 439/725
[58] Field of Search ............... 439/119, 121, 122, 225, 439/391, 396, 397, 398, 402, 403, 404, 409, 410, 716, 717, 718, 720–725, 727, 92, 94, 105, 108, 715

[56] References Cited

U.S. PATENT DOCUMENTS

| 3,702,457 | 11/1972 | Fujita | 439/717 |
| 4,533,196 | 8/1985 | Forberg et al. | 439/404 |
| 4,538,874 | 9/1985 | Dambach et al. | 439/723 |
| 4,541,682 | 9/1985 | Gerke et al. | 439/404 |
| 4,607,135 | 8/1986 | Tabyl et al. | 439/716 |

FOREIGN PATENT DOCUMENTS 2645325 4/1977 Fed. Rep. of Germany ...... 439/717

Primary Examiner—David Pirlot
Attorney, Agent, or Firm—McGlew and Tuttle

[57] ABSTRACT

A connector bank for cable wires (2,3,4) of telephone cables such that two cable wires (2,4 or 3,4, resp.) connected with each other over the connector bank can be separated from each other, with no need to loosen the respective contact connections. For this, the invention provides for each connecting element (7) a plug (6, 6a) with a contact lug (24, 24a) for insertion into the center contact (11) of the connecting element (7), the plug (6, 6a) being provided with a cable connecting element (20,31) for connection of a cable wire (4).

11 Claims, 2 Drawing Sheets

CONNECTOR BANK FOR CABLE WIRES, IN PARTICULAR OF TELEPHONE CABLES

FIELD AND BACKGROUND OF THE INVENTION

The invention relates to a connector bank for cable wires, in particular of telephone cables.

A connector bank of this species is known from the DE-OS No. 34 15 369. It serves for the simultaneous connection of thick dropwire cable wires and of thin cable wires at one connecting element. Thereby, the thick dropwire cable wire and the further thin cable wire are connected to one single connecting contact having a contact slot with different slot width for cable wires with different outside diameters. The centre contacts of the connector bank serve for the connection of an overvoltage suppressor magazine.

Here, it is disadvantageous that the two cable wires connected commonly to one connecting contact cannot be separated from each other without loosening the contact connection between the one cable wire and the connecting contact.

As this is usually a cutting/clamping contact, the cable wire must be cut off for loosening from the connecting contact.

The invention is, therefore, based on the object provide a connector bank for cable wires, in particular of telephone cables, for which the possibility exists to separate the two cable wires connected to a connecting element from each other, without loosening the contact connection between one of the cable wires and the respective connecting contact.

SUMMARY AND OBJECT OF THE INVENTION

According to the invention, one cable wire, in particular the dropwire cable wire, is connected to the connecting contact of the connecting element firmly mounted in the connector bank, here particularly by means of a cutting/clamping contact, whereas the other cable wire is connected to the cable connecting element of the plug, which is plugged into the centre contact of the connecting element by means of its contact lug. By pulling the plug out of the connector bank, thus, an easy separation of the electrical connection between the two cable wires can take place, with no need to loosen the contact connection of each cable wire with its respective connecting contact or cable connecting element, resp.

Further, both cable wires can be wired independently from each other.

The connector bank according to the invention can be applied particularly in cases, where within a telephone cable net, not only standardized telephone cables with thin cable wires are laid, but also special dropwire cables (overhead cables) with appreciably thicker cable wires. They have an extremely thick covering for insulation purposes. A connection location between a dropwire cable and a standardized telephone cable is established, where a transition from a drip-wire cable to a standardized telephone cable is required, e.g. at a house connection within a terminal block.

Further advantageous embodiments of the invention result from the sub-claims. Special attention is directed to the possibility to provide the plugs either with terminal screws or with cutting/clamping contacts, such that optionally a connection can be performed with a screwdriver or with a special connection tool or simply by closing the housing cover without any tool. The invention provides, further, the possibility of the integration of overvoltage suppressors into the connector bank.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
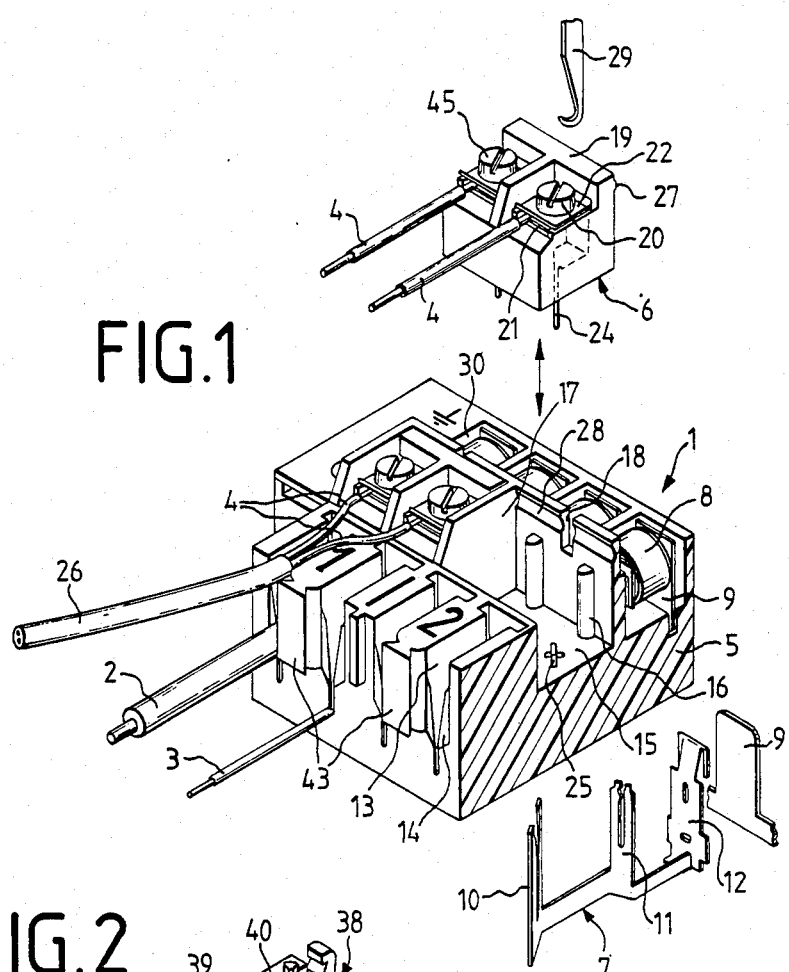
FIG. 1 is a perspective view of the connector bank with a plug pulled out toward top and with a connecting element and an earth or ground contact pulled out toward bottom.

The connector bank 1, shown in FIG. 1 in a sectional perspective representation, for cable wires 2, 3 and 4 consists of a plastic body 5, several plugs 6 inserted into the latter from above, several connecting elements 7 inserted from below, and overvoltage suppressors assigned to the connecting elements 7, as well as of an earthing or grounding rail 9.

Each connecting element 7 has a connecting contact 10 for a cable wire 2,3, a center contact 11 for the connection with a cable wire 4, and a contact spring 12 for contacting an overvoltage suppressor 8. For each connecting contact 10, on the front side of the plastic body 5, an accommodation opening 13 is left, which is provided on the front side with a clamping slot 14 for clamping the insulation covering of the cable wires 2,3. The clamping slot 14 narrows toward bottom, such that cable wires 2,3 having insulation coverings of different thicknesses can securely be clamped fast. The slot width, too, of the connecting contact 10 itself narrows toward bottom, such that cable wires 2,3 of different thicknesses can securely be clamped fast. The connecting contacts 10 are cutting/clamping contacts, being arranged under an angle of 45° to the cable wires 2,3 introduced into the accommodation opening 13.

Approximately in the longitudinal center of the plastic body 5, several accommodation chambers 15 for the plugs 6 are provided. The plugs 6 consist of plastic bodies having a rectangular cross-section, the accommodation chambers 15 being adapted to the dimensions of said plastic bodies. On the rear wall of the accommodation chamber 15 shown in FIG. 1, two ribs 16 extending vertically to the bottom of the accommodation chamber 15 are provided, the ribs 16 engaging into corresponding, not shown grooves of the plugs 6. They effect a guiding of the plugs 6 when inserting into the accommodation chambers 15, and provide simultaneously a protection against torsion during mounting. Two accommodation chamber 15 each for the plugs 6 are separated from each other by separating walls 17. In the rear wall of each accommodation chamber 15, further slots 18 are provided between the ribs 16, their purpose being explained below.

Each plug 6 consists of plastic and exhibits on its upper side T-shaped crosspieces 19, being illustrated in particular in FIG. 1. In the this way subdivided upper sides of each plug 6, terminal screws 45 are arranged, being each formed by two small metal plates 21,22 and a threaded screw 23. The upper metal plate 22 is connected to a metal contact lug 24, projecting through the plug 6 toward bottom and protruding—as shown in FIG. 1—freely toward bottom from the plug 6. The two contact lugs 24 of each plug 6 contact when inserting the plug 6 into its accommodation chamber 15 the center contacts 11 of the respective connecting elements 7.

For this purpose, in the bottom of each accommodation chamber 15, cross-shaped openings 25 are provided, into which the center contacts 11 project from below, i.e. within the plastic body 5, and into which the contact lugs 24 of the plugs 6 are inserted from above, the centre contacts 11 and the contact lugs 24 crossing themselves to make electrical contact.

Each plug 6 is provided with two terminal screws 45 for the connection of one cable wire 4 each of a telephone cable 26. By insertion of a plug 6 into the plastic body 5, the two cable wires 4 of the telephone cable 26 are, thus, connected over the contact lugs 24 and the center contacts 11 to two connecting elements 7, to the connecting contacts 10 of which one cable wire 2,3 each being connected, which may be part, e.g., of a dropwire cable.

When inserting the plug 6, simultaneously a rear-side cross rib 27 snaps into a cross groove 28 being arranged on the rear wall of each accommodation chamber 15. Because of the design of the body 5 of the connector bank 1 as well as of the plug 6 made from plastic, an elastical snap-in effect takes place when doing so. For pulling the plug 6 out from its accommodation chamber 15, a hook-type tool 29 shown in FIG. 1 on top is used, said tool 29 engaging into the slot 18 of the rear wall of the accommodation chamber 15 and behind the cross rib 27 of the plug 6.

On the rear side of the plastic body 5, accommodation chambers 30 assigned to each connecting element 7 are provided for the overvoltage suppressors 8. Into these accommodation chambers 30, the contact springs 12 of the connecting elements 7 as well as the earthing contact rail 9 engage from below. The overvoltage suppressors 8 are inserted from above into the accommodation chambers 30 and are held in clamping action between the earthing contact rail 9 and the contact springs 12 of the connecting elements 7.

Figure 2:
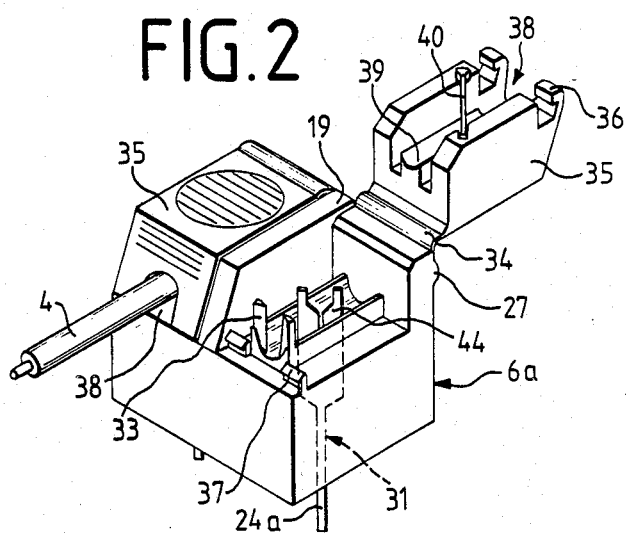
FIG. 2 is a perspective view of a plug in an alternative embodiment.

Another embodiment of the plug 6a is illustrated in FIG. 2. It differs from the plug 6 according to FIG. 1 by that, instead of terminals screws 45, the cable connecting elements 31 consist of cutting/clamping contacts 44, which are designed as integral parts together with the contact lugs 24a protruding from the plug 6 toward bottom. In the two upper free spaces of the plug 6a formed by the T-shaped crosspiece 19, depressions 32 for insertion of the cable wires 4 are provided, into which depressions the cutting/clamping contacts 44 being inserted under 45° with respect to the longitudinal axis of the depression. At the front end of the depression, clamping crosspieces 33 for clamping the insulation covering of the cable wires 4 are provided.

By means of a film hinge 34, one housing cover 35 each is is mounted, being lockable in its closed position by means of notches 36 and counter-notches 37 at the body of the plug 6a. The housing cover 35 is provided with a slot 38, which is provided with a counter-depression 39, which forms, together with the depression 32, a tube-shaped guiding and holding for the cable wire 4, when closing the housing cover 35. Further, in the slot 38, a press-in crosspiece 40 made from metal or plastic is provided, the press-in crosspiece 40 is arranged making a 45° angle with respect to the longitudinal axis of the slot 38 in such way that it engages when closing the cover 35 into the slot of the cutting/clamping contact 44 being arranged, too, under 45° in the depression 32, whereby the contact 44 and the press-in crosspiece to cross themselves to provide electrical contact. In this way, when closing the cover 35, the cable wire 4 is automatically pressed into the cutting/clamping contact 44, such that an electrical contact from the cable wire 44 to the contact lug 24 is established. The plug 6a is also provided with a cross rib 27 on its rear side.

Figure 3:
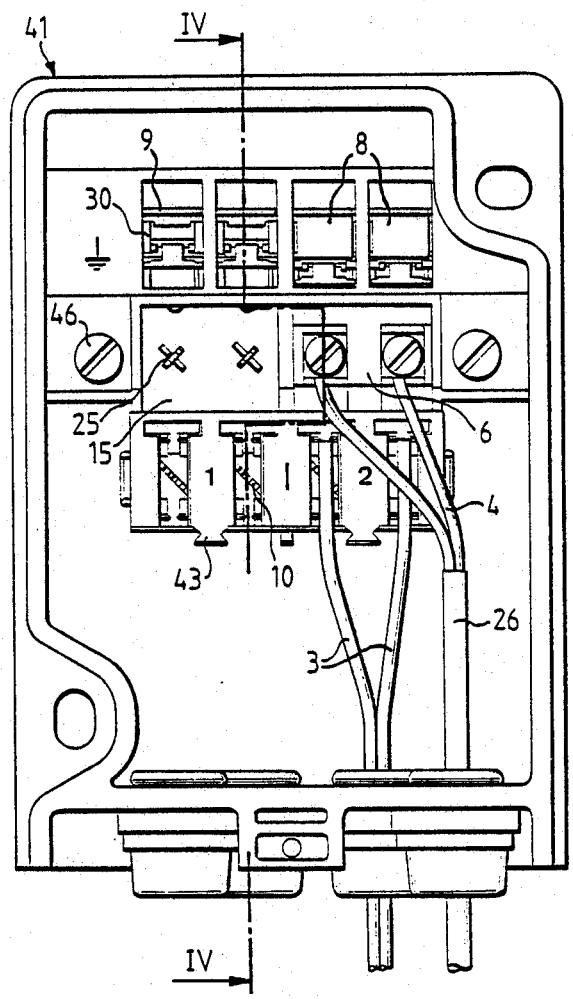
FIG. 3 is a top view of an opened-up terminal box with integrated connector bank.

FIG. 3 shows the arrangement of a connector bank 1 within a terminal block 41 closable by a cover 42.

In FIG. 3, on the right-hand side, a plug 6 is inserted into the accommodation opening 15 of the connector bank 1, the cable wires 4 of a telephone cable 26 being connected to said plug 6. Further, two cable wires 3 are connected in clamping action to the connecting contacts 10 arranged under 45° of the respective connecting elements 7. Finally, two overvoltage suppressors 8 are inserted into the respective accommodation chambers 30. The earthing contact or ground rail 9 is connected to an earth connection 46.

Figure 4:
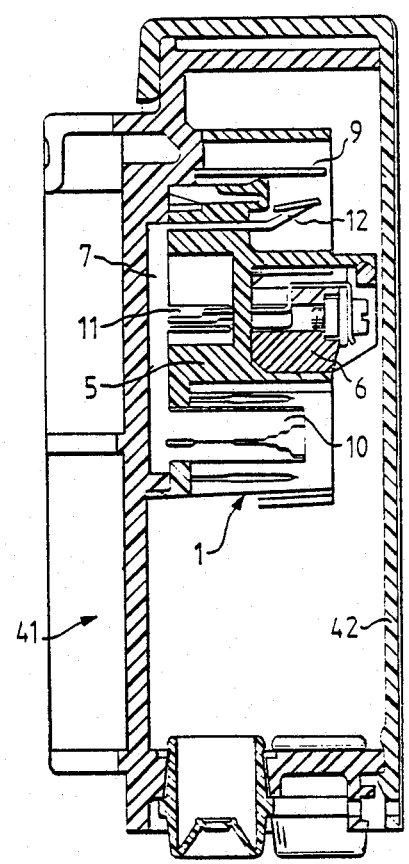
FIG. 4 is a cross-section taken along the line IV—IV in FIG. 3 through the closed terminal box.

On the front face of the connector bank 1, guides 43 for accommodation of suitably shaped guides of the plug 6,6a are provided. In pulled-out situation of the plug 6,6a, the plug 6,6a will be plugged on these guides 43 and occupies, thus, a defined position in the terminal block 41. On the left-hand side, mounting of a plug 6,6a, of the cable wires 2,3,4, and of the overvoltage suppressors 8 has not yet been performed. In the sectional representation in FIG. 4, the connecting contact 10 mounted into the plastic body 5 of the connector bank 1 and the center contact 11 as well as the contact spring 12 of a connecting element 7 and the earthing rail 9 are clearly visible.

While specific embodiments of the invention have been shown and described in detail to illustrate the application of the principals of the invention, it will be understood that the invention may be embodied otherwise without departing from such principles.

What is claimed is:

1. A connector bank for cable wires of telephone cables, the cable wires being thick dropwire cable wires and thinner cable wires comprising: a plastic connection body defining a plurality of slots, at least one accommodation chamber and a plurality of overvoltage protection chambers; a plurality of connecting elements corresponding to each said slot, each connecting element including a connecting contact, a center contact and a contact spring, each connecting contact, center contact and contact spring being formed integral and positioned within said connection body such that said connecting contact is positioned in said slot with a cutting/clamping member positioned on each side of said slot, said center contact being positioned in communication with said at least one accommodation chamber through an opening in said accommodation chamber and said contact spring being positioned in one of said plurality of overvoltage protection chambers; a plurality of ground contact rails each ground contact rail being positioned within one of said plurality of overvoltage protection chambers and cooperating with one of said contact springs, each of said ground contacts and cooperating contact spring being adapted to receive an overvoltage suppressor in one of said overvoltage protection chambers; and, at least one plug having at least one cable connecting element and a corresponding contact lug, said at least one plug being positionable within said at least one accommodate chamber, said contact lug being positioned adjacent said opening engaging said center contact, thereby allowing one of the thick dropwire cable or thinner cable wires to be connected to said connecting contact in said slot and to be in electrical connection with another thick dropwired cable or thinner cable wire connected to said cable connecting element of said at least one plug and capable of being disconnected by removing said at least one plug without disturbing the cable wire connected to said connecting element of said slot which is still electrically connected to the overvoltage suppressor through said contact spring.

2. A connector bank according to claim 1, wherein: said at least one plug includes two cable connecting elements each having one contact lug, each contact lug being associated with a single slot and a single center contact.

3. A connector bank according to claim 1, wherein: said plastic body includes an accommodation channel including a plurality of accommodation chambers for a plurality of plugs, each plug having several cable connecting elements, said accommodation channel being arranged in a longitudinal direction.

4. A connector bank according to claim 1, wherein: said plastic body includes a plurality of accommodation chambers each adapted to receive a plug, each accommodation chamber including vertical ribs adapted to engage corresponding grooves in said plug.

5. A connector bank according to claim 1 wherein: said opening in said plastic body is in the form of a cross-shaped opening, the position of said cross-shaped opening corresponding to the position of said contact lugs when said plug is positioned within an associated accommodation chamber.

6. A connector bank according to claim 1, wherein: each of said cable connecting elements associated with one of said plugs including a terminal screw and a metal plate connected with said contact lug, said terminal screw and said metal plate cooperating to make electrical contact with a cable wire.

7. A connector bank according to claim 1, wherein: each of said cable connecting elements associated with said plug includes a cutting/clamping contact formed integral with said contact lug.

8. A connector bank according to claim 1, wherein: said plug being a test plug adapted to be connected to said connector bank while maintaining connection between said connecting contact and said overvoltage suppressor.

9. A connector bank according to claim 1, wherein: said plastic body includes a front face having a guide adapted to cooperate with a corresponding groove of said at least one plug.

10. A connector bank according to claim 7, wherein: said plug includes a plug body and a plug cover, said plug cover being connected to said plug body by a film hinge, said cover being provided with a press-in crosspiece adapted to cooperate with said cutting/clamping contact element to press a cable wire into the cutting/clamping contact element.

11. A connector bank according to claim 10, wherein: said plug cover includes notches cooperating with corresponding counter notches of said plug body, said counter notches engaging in said notches to connect said plug body and said plug cover.

* * * * *